US011192667B2

(12) United States Patent
Gordon et al.

(10) Patent No.: US 11,192,667 B2
(45) Date of Patent: Dec. 7, 2021

(54) MULTI-LAYERED SELF-HEALING MATERIAL SYSTEM TOWARDS IMPACT MITIGATION

(71) Applicant: U.S.A. as represented by the Administrator of the National Aeronautics and Space Administration, Washington, DC (US)

(72) Inventors: Keith L. Gordon, Hampton, VA (US); Scott R. Zavada, Ypsilanti, MI (US); Timothy F. Scott, Ann Arbor, MI (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 430 days.

(21) Appl. No.: 14/969,855

(22) Filed: Dec. 15, 2015

(65) Prior Publication Data

US 2016/0167811 A1 Jun. 16, 2016

Related U.S. Application Data

(60) Provisional application No. 62/091,826, filed on Dec. 15, 2014.

(51) Int. Cl.
*B64G 1/56* (2006.01)
*B32B 27/08* (2006.01)
(Continued)

(52) U.S. Cl.
CPC .............. *B64G 1/56* (2013.01); *B32B 27/08* (2013.01); *B32B 27/308* (2013.01);
(Continued)

(58) Field of Classification Search
CPC ............ C08G 75/045; B64G 1/56; C08F 4/52
See application file for complete search history.

(56) References Cited

U.S. PATENT DOCUMENTS 3,661,744 A * 5/1972 Kehr .......................... C08F 2/00
428/419
3,666,133 A * 5/1972 Benning ................... B64G 1/56
220/560.02
(Continued)

OTHER PUBLICATIONS

Dhoot et al., Encyclopedia of Polymer Science and Technology—Barrier Polymers article, Mar. 15, 2002, John Wiley & Sons, Inc., vol. 5, pp. 198-263. (Year: 2002).*
(Continued)

*Primary Examiner* — Elizabeth A Robinson
(74) *Attorney, Agent, or Firm* — Jennifer L. Riley; Robin W. Edwards; Helen M. Gaius

(57) ABSTRACT

Various embodiments provide multi-layered self-healing materials, capable of repairing puncture damage. The multi-layered self-healing materials, capable of repairing puncture damage of the various embodiments may be constructed by sandwiching a reactive (e.g., oxygen sensitive) liquid monomer formulation between two solid polymer panels, such as a polymer panel of Barex 210 IN (PBG) serving as the front layer panel and a polymer panel of Surlyn® 8940 serving as the back layer panel. The various embodiments may provide methods to produce multi-layered healing polymer systems. The various embodiments may provide a two-tier, self-healing material system that provides a non-intrusive capability to mitigate mid to high velocity impact damage in structures.

17 Claims, 7 Drawing Sheets

(51) Int. Cl.
    *B32B 27/30*      (2006.01)
    *B64G 6/00*       (2006.01)
(52) U.S. Cl.
    CPC ....... *B32B 2255/10* (2013.01); *B32B 2255/24* (2013.01); *B32B 2307/7244* (2013.01); *B32B 2307/762* (2013.01); *B64G 6/00* (2013.01)

(56) References Cited

U.S. PATENT DOCUMENTS

| | | | | |
|---|---|---|---|---|
| 6,439,508 | B1* | 8/2002 | Taylor | B64G 1/12 244/158.3 |
| 8,063,171 | B2 | 11/2011 | Klein | |
| 2003/0226472 | A1* | 12/2003 | Kneafsey | C09J 4/00 106/18.13 |
| 2009/0191402 | A1* | 7/2009 | Beiermann | B29C 73/22 428/323 |
| 2010/0174041 | A1* | 7/2010 | Klein | C08F 10/00 526/335 |

OTHER PUBLICATIONS

Hild, Surface Energy of Plastics, Dec. 16, 2009, pp. 1-3, downloaded on May 31, 2018 from https://www.tstar.com/blog/bid/33845/surface-energy-of-plastics (Year: 2009).*
Micronized Silica sheet, pp. 1-2, downloaded on Jan. 14, 2019 from https://www.bestmadeinkorea.com/product-22419/Chemicals-Rubber-Plastics/Micronized-Silica.html (Year: 2019).*
Wool, R.P., Polymer Interfaces: Structure and Strength (Hanser/Gardner, Munich 1995), Chapter 11 pp. 398-444, Chapter 12, pp. 445-479.
White, S.R., et al., "Autonomic healing of polymer composites," Nature, Feb. 15, 2001, vol. 409, pp. 794-797.
Pang. J.W., et al., "Bleeding composites'-damage detection and self-repair using a biomimetic approach," Composites Part A: Applied Science and Manufacturing, 2005, vol. 36(2), pp. 183-188.
Pang, J.W., et al., A hollow fibre reinforced polymer composite encompassing self-healing and enhanced damage visibility, Composites Science and Technology, 2005, vol. 65 (11-12), pp. 1791-1799.
Dry, C., "Passive Tuneable Fibers and Matrices," International Journal of Modern Physics B, 1992, vol. 6, No. 15 & 16, pp. 2763-2771.
Dry, C., et al., "Three-part methylmethacrylate adhesive system as an internal delivery system for smart responsive concrete," Smart Materials and Structures, 1996, vol. 5(3), pp. 297-300.
Manu J., et al., "Self-healing of sandwich structures with a grid stiffened shaped memory polymer syntactic foam core," Smart Materials and Structures, 2010, vol. 19, pp. 075013-075024, 12 pages.
Jones, N., et al., Li, G., "A self-healing 3D woven fabric reinforced shape memory polymer composite for impact mitigation." Smart Materials and Structures, 2010, vol. 19, pp. 035007-035015.
Meure, S., et al., "Poly[ethylene-co-(methacrylic acid)] Healing Agents for Mendable Carbon Fiber Laminates" Macromolecular Materials Engineering, 2010, vol. 295, pp. 420-424.
Chen, X., et al., "New Thermally Remendable Highly Cross-Linked Polymeric Materials," Macromolecules, 2003, vol. 36, pp. 1802-1807.
Chen, X., et al., "A Thermally Re-Mendable Cross-Linked Polymeric Material", Science, 2002, vol. 295, pp. 1698-1702.
Wojtecki, R. et al., "Using the dynamic bond to access macroscopically responsive structurally dynamic polymers," Nature Materials, Jan. 2011, vol. 10, pp. 14-27.
Cheng, S., et al., "Taking Advantage of Non-Covalent Interactions in the Design of Self-Healing Polymers," Polymer Preprints, 2008, vol. 49(1), 978-979.
Cordier, P., et al., "Self-healing and thermoreversible rubber from supramolecular assembly", Nature, 2008, vol. 451, pp. 977-980.
Canadell, J. el al., Self-Healing Materials Based on Disulfide Links, Macromolecules, 2011, vol. 44, pp. 2536-2541.

Burnworth, M., et al., "Optically heatable supramolecular polymers", Nature, 2011, vol. 472, Apr. 21, 2011, pp. 334-337.
Deng, G., Covalent Cross-Linked Polymer Gels with Reversible Sol-Gel Transition and Self-Healing Properties, Macromolecules, 2010, vol. 43, pp. 1191-1194.
Smith, J., "An Assessment of Self-Healing Fiber Reinforced Composites," NASA/TM-2012-217325, 2011, pp. 1-23 found at ntrs.nasa.gov.
Lantman, C.W., et al., "Structural Properties of Ionomers.", Annual Rev. Mat., 1989, vol. 19, pp. 295-317.
Hird, B., et al., "Sizes and Stabilities of Multiplets and Clusters in Carboxylated and Sulfonated Styrene Ionomers," Macromolecules, 1992, vol. 25, No. 24, pp. 6466-6474.
Kalista, S., M.S. thesis entitled, "Self healing Thermoplastic Poly(Ethylene-co-Methacrylic Acid) Copolymers Following Projectile Puncture" submitted to the faculty of Virginia Polytechnic Institute and State University, Blacksburg, VA 2003.
Fall, R., M.S. thesis entitled, "Puncture Reversal of Ethylene Ionomers-Mechanistic Studies," submitted to the faculty of Virginia Polytechnic Institute and State University, Blacksburg, VA , Aug. 29, 2001, pp. 1-64.
Varley, R.J., et al., "Towards an Understanding of Thermally Activated Self-Healing of an Ionomer System during Ballistic Penetration," Acta Materialia, 2008, 56, pp. 5737-5750.
Varley, R.J., et al.,"Autonomous Damage Initiated Healing in a Thermo-Responsive Ionomer." Polym. Int., 2010, vol. 6, No. 59, pp. 1031-1038.
Orbital Debris Program Office, Accessed on Oct. 9, 2018, https://orbitaldebris.jsc.nasa.gov/, pp. 1-2.
K. Gordon, et al., "Puncture Self-healing Polymers for Aerospace Applications", 242nd American Chemical Society National Meeting and Exposition, Aug. 28, 2011, Denver, Colorado, pp. 1-2.
Hoyle, C. E., "Thiol-enes: Chemistry of the past with promise for the future.", J. Polym. Sci. Pol. Chem. 2004, vol. 42 (21), pp. 5301-5338.
Hoyle, C. E., et al., "Thiol-click chemistry: a multifaceted toolbox for small molecule and polymer synthesis.", Chem. Soc. Rev. 2010, vol. 39 (4), pp. 1355-1387.
Dondoni, A., "The emergence of thiol-ene coupling as a click process for materials and bioorganic chemistry.", Angew Chem Int Ed Engl 2008, vol. 47 (47), pp. 8995-8997.
Cramer, N. B. et al., "Kinetics of thiol-ene and thiol-acrylate photopolymerizations with real-time Fourier transform infrared.", J. Polym. Sci. Pol. Chem. 2001, vol. 39 (19), pp. 3311-3319.
Lu, H. et al., "Investigations of step-growth thiol-ene polymerizations for novel dental restoratives". Dent. Mater. 2005, 21 (12), pp. 1129-1136.
Kade, M. J., et al., "The Power of Thiol-ene Chemistry.", J. Polym. Sci. Pol. Chem. 2010, vol. 48(4), pp. 743-750.
Dawson, T. L. et al., "Free Radical Chain Transfer to Allyl Monomers at Low Polymerization Temperatures.", J Polym Sci Part A 1965, vol. 3, pp. 1801-1805.
Cramer, N. B., et al., "Investigation of thiol-ene and thiol-ene-methacrylate based resins as dental restorative materials.", Dental Materials 2010, vol. 26 (1), pp. 21-28.
Iwata, H. et al., "Initiation of Radical Polymerization by Glucose-Oxidase Utilizing Dissolved-Oxygen"., J. Polym. Sci. Pol. Chem. 1991, vol. 29(8), pp. 1217-1218.
Johnson, L. M. et al., "Enzyme-mediated redox initiation for hydrogel generation and cellular encapsulation.", Biomacromolecules 2009, vol. 10 (11), pp. 3114-3121.
Navamal, M., et al., "Thiolytic chemistry of alternative precursors to the major metabolite of the cancer chemopreventive oltipraz." J. Org. Chem., 2002, vol. 67 (26), pp. 9406-9413.
Velayutham, M., et al., "Glutathione-mediated formation of oxygen free radicals by the major metabolite of oltipraz" Chem Res Toxicol 2005, vol. 18 (6), pp. 970-975.
Kalista, S. J., et al., Thermal characteristics of the self-healing responses in poly(ethylene-co-methacrylic acid) copolymers, Journal of the Royal Society Interface, 2007, vol. 4, pp. 405-411.
Kessler, M. R., "Self-healing: a new paradigm in materials design", Proc. IMech Eng G-J Aer 2007, vol. 221 (G4), pp. 479-495.

(56) References Cited

OTHER PUBLICATIONS

Blaiszik, B. J., et al., Kramer, S. L. B.; Olugebefola, S. C.; Moore, J. S.; Sottos, N. R.; White, S. R., "Self-Healing Polymers and Composites", Annu Rev Mater Res 2010, 40, pp. 179-211.
Rojdev, K., et al., "Advanced Multifunctional MMOD Shield: Radiation Shielding Assessment", AIAA 43rd International Conference on Environmental Systems, Jul. 14-18, 2013, AIAA-3380, pp. 1-10, Vail, Colorado.

* cited by examiner ethylene glycol
dimercaptopropionate
(EGDMP)

trimethylol propane
triallyl ether
(TMPTAE)

Thiocure ETTMP 1300 (from Bruno Bock)
Ethoxylated trimethypropane
tri (3-mercaptopropionate)

Allyl Ether-functional PEG

MULTI-LAYERED SELF-HEALING MATERIAL SYSTEM TOWARDS IMPACT MITIGATION

CROSS-REFERENCE TO RELATED PATENT APPLICATION(S)

This patent application claims the benefit of and priority to U.S. Provisional Patent Application No. 62/091,826 entitled "Multi-Layered Self-Healing Material System Towards Impact Mitigation" filed Dec. 15, 2014, the contents of which IS hereby incorporated by reference in its entirety.

STATEMENT REGARDING FEDERALLY SPONSORED RESEARCH OR DEVELOPMENT

The invention described herein was made in part by an employee of the United States Government and may be manufactured and used by or for the Government of the United States of America for governmental purposes without the payment of any royalties thereon or therefore.

BACKGROUND OF THE INVENTION

Exploration, and in particular space exploration, is an intrinsically risky and expensive proposition, therefore there is great incentive to look for ways to achieve exploration safely and affordably. Typically it requires about $10,000 per pound to launch mass into orbit. Therefore, there is great interest in finding innovative ways to reduce mass of objects to be sent into orbit. Weight savings may be realized by using more damage tolerant systems to avoid carrying extra weight for replacement sections and repair components. Self-healing materials provide for improved damage tolerance in load bearing structures, and a means of self-mitigation, or self-reliability for overall vehicle health and durability. The self-healing materials capable of puncture healing upon impact show great promise for space exploration applications wherein an internal structural breach caused by micrometeoroid impacts, which could be catastrophic for the astronaut crew, would be self-contained to allow the retention of air pressure to the greatest extent possible. Additionally, these self-healing materials provide for improved damage tolerance in load bearing structures and self-mitigation, or self reliability, with respect to overall vehicle health and durability. This approach is also applicable to other pressure vessel type structures which may have critical requirements with regard to a contained fluid (e.g. fuel tanks).

Self-healing materials display the unique ability to mitigate incipient damage and have built-in capability to substantially recover structural load transferring ability after damage. In recent years, researchers have studied different "self-healing mechanisms" in materials as a collection of irreversible thermodynamic paths where the path sequences ultimately lead to crack closure or resealing. Crack repair in polymers using thermal and solvent processes, where the healing process is triggered with heating, or with a solvent, have been studied. A second approach involves the autonomic healing concept, where healing is accomplished by dispersing a microencapsulated healing agent and a catalytic chemical trigger within an epoxy resin to repair or bond crack faces and mitigate further crack propagation. Another related approach, the microvascular concept, utilizes brittle hollow glass fibers (in contrast to microcapsules) filled with epoxy hardener and uncured resins in alternating layers, with fluorescent dye. An approaching crack ruptures the hollow glass fibers, releasing healing agent into the crack plane through capillary action. A third approach utilizes a polymer that can reversibly re-establish its broken bonds at the molecular level by either thermal activation (i.e., based on Diels-Alder rebonding), or ultraviolet light. A fourth approach utilizes structurally dynamic polymers, which are materials that produce macroscopic responses from a change in the materials molecular architecture without heat or pressure. A fifth approach involves integrating self-healing resins into fiber reinforced composites producing self-healing fiber reinforced composites. Various chemistries have been used in the aforementioned approaches.

The aforementioned self-healing approaches address the repair, or mitigation, of crack growth and various damage conditions in materials, but have the following disadvantages: 1) Slow rates of healing; 2) Use of foreign inserts in the polymer matrix that may have detrimental effects on composite fiber performance; 3) Samples have to be held in direct contact, or under load and/or fused together under high temperature for long periods of time; 4) Do not address damage incurred by ballistic or hypervelocity impacts; and/or 5) May not be considered a structural load bearing material.

Materials that are capable of puncture healing upon impact show great promise for space exploration applications wherein an internal breach caused by micrometeoroid impacts which would normally be considered catastrophic would now be self-contained. This type of material also provides a cross-cutting route for improved damage tolerance in load bearing structures and a means of self-mitigation or self-reliability in respect to overall vehicle health and aircraft durability. In puncture healing materials, healing is triggered by the ballistic or damage event. (Ballistics tests are used to simulate micro-meteoroid damage in lab tests). The force of the bullet on the material and the materials response to the bullet (viscoelastic properties) activates healing in these materials. Polymers such as DuPont's Surlyn®, Dow's Affinity™ EG8200G, and INEO's Barex™ 210 IN (PBG) have demonstrated healing capability following penetration of fast moving projectiles—velocities that range from 9 mm bullets shot from a gun (~300 m/sec) to close to micrometeoroid debris velocities of 3-5 km/sec. Unlike other self-healing methodologies described above, these materials inherently self-heal in microseconds due to their molecular design. However, DuPont's Surlyn®, is not considered a load bearing material and INEO's Barex 210 IN is not puncture healing at temperatures lower than 50° C. These materials were not originally designed to be self-healing. However, their puncture-healing behavior is a consequence of the combination of viscoelastic properties under the conditions induced by projectile penetration.

BRIEF SUMMARY OF THE INVENTION

Various embodiments provide multi-layered self-healing materials, capable of repairing puncture damage. The multi-layered self-healing materials, capable of repairing puncture damage of the various embodiments may be constructed by sandwiching a reactive (e.g., oxygen sensitive) liquid monomer formulation between two solid polymer panels, such as a polymer panel of Barex 210 IN (PBG) serving as the front layer panel and a polymer panel of Surlyn® 8940 serving as the back layer panel. The various embodiments may provide methods to produce multi-layered healing polymer systems. The various embodiments may provide a two-tier, self-healing material system that provides a non-intrusive capability to mitigate mid to high velocity impact damage in structures.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
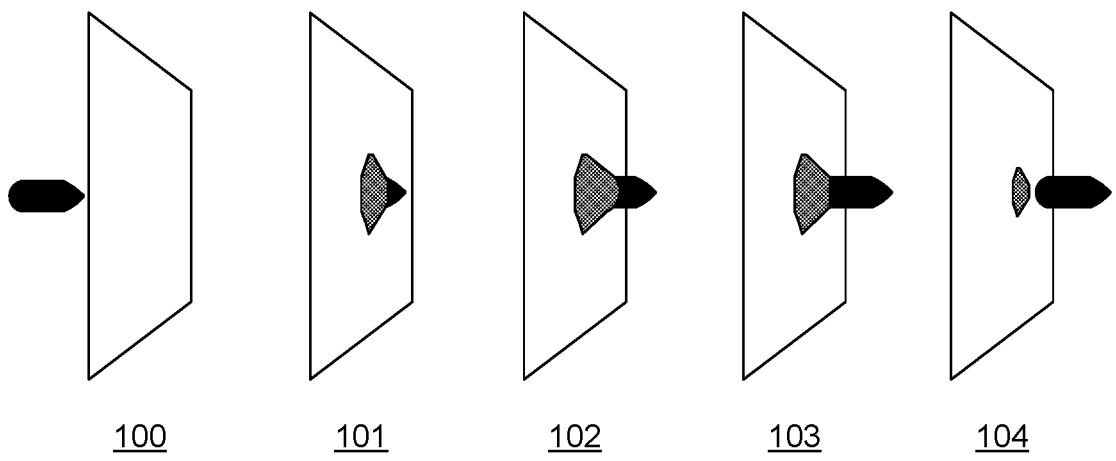
FIG. 1 is a schematic diagram illustrating thermoplastic puncture repair healing polymers.
Figure 1:
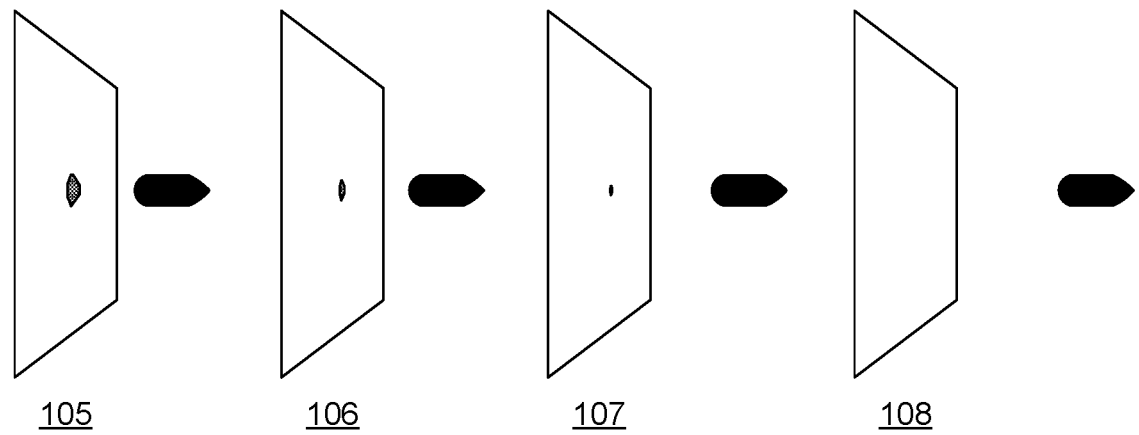

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Ionomers contain ionic functional groups at low concentrations (<15 mol %) along the polymer backbone. For example, commercially-available poly(ethylene-co-methacrylic acid) (EMAA), referred to using the trade name Surlyn® by DuPont, is an ionomer that contains ionic groups at low concentrations (<15 mol %) along the polymer backbone. In the presence of oppositely charged ions, these ionic groups form aggregates that can be activated by external stimuli such as temperature or ultraviolet irradiation. EMAA undergoes puncture reversal (self-healing) following high velocity ballistic penetration (300 m/s-5 km/sec). The heat generated from the damage event triggers self-healing in this material. EMAA polymers are manufactured by DuPont and are used extensively in human prosthetics and as packaging materials. Although EMAA polymers possess excellent puncture healing properties, they were not originally envisioned for such use. However, the puncture-healing behavior was a consequence of the combination of viscoelastic properties under the conditions induced by projectile penetration.

Figure 2:
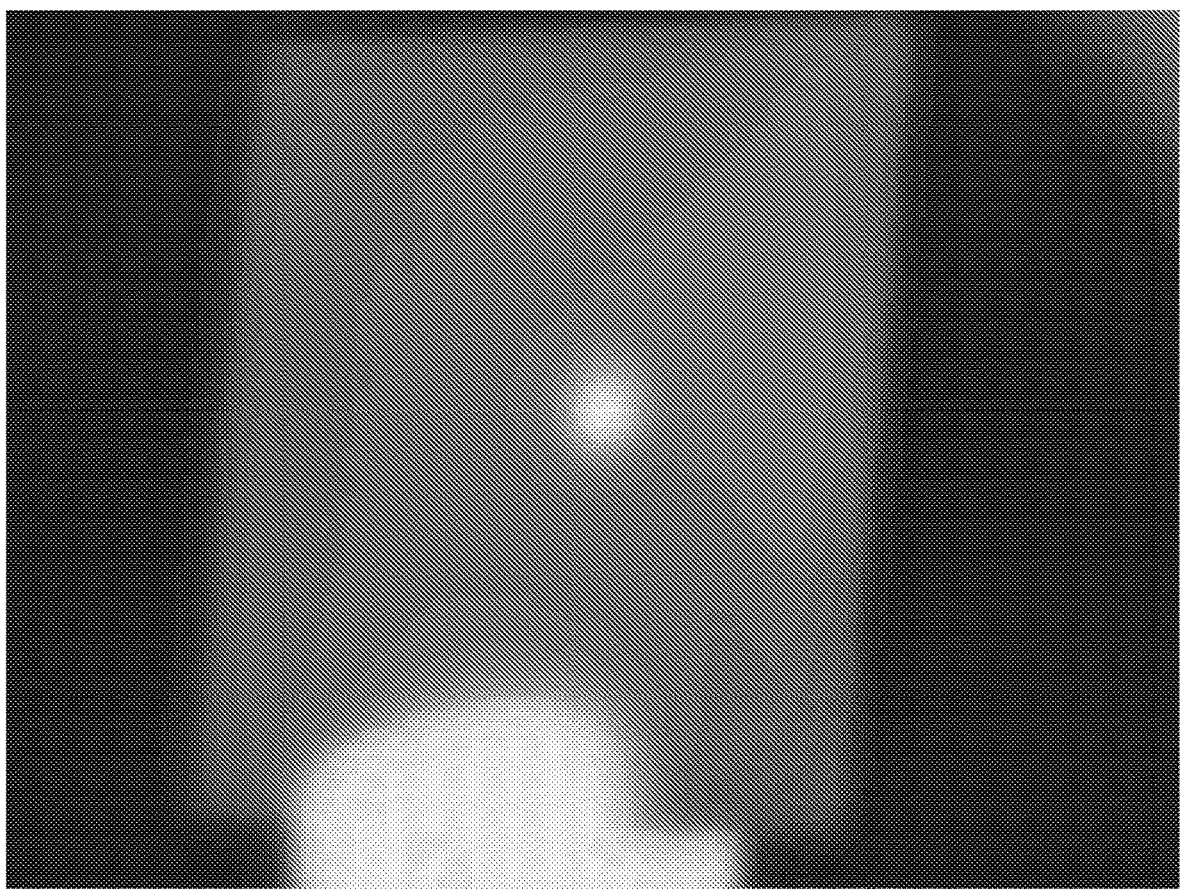
FIG. 2 is a thermal image of a self-healing panel immediately after projective penetration.

FIG. 1 illustrates the puncture healing concept. Puncture healing in the various embodiment materials may be the result of the synergistic combination of viscoelastic properties that the polymers possess. Self-healing behavior may occur upon projectile puncture whereby energy must be transferred to the material during impact both elastically and inelastically, thus establishing two requirements for puncture healing to occur: 1) The need for the puncture event to produce a local melt state in the polymer material; and 2) The molten material has to have sufficient melt elasticity to snap back and close the hole. Ballistic testing studies have revealed that Surlyn® materials heated to a temperature of ~98° C. during projectile puncture (3° C. higher than Suryln's® melting temperature) may display self-healing behavior. Additional ballistic testing studies conducted revealed that Surlyn® materials heated to a temperature ~240° C. during projectile puncture may display self-healing behavior. The temperature increase produces a localized flow state and the melt elasticity to snap back, thus closing the hole (as illustrated in FIG. 1 in which images 100, 101, 102, 103, 104, 105, 106, 107, and 108 show the material before, during, and after projectile puncture). Additionally, FIG. 2 is a thermal image of a self-healing panel immediately after projective penetration illustrating the localized flow state of the hole based on the high relative temperature of the hole versus the rest of the panel, as indicated by the light color of the hole and the relatively darker color of the panel around the hole. In studies conducted at NASA Langley Research Center, high speed video recording was used to capture footage of the puncture healing mechanism at the puncture site during a ballistics test conducted at various temperatures for various self-healing polymers. The mechanism of healing for the respective polymers begins by the tip of the bullet punching a hole through the panel as it penetrates the panel (image 101 of FIG. 1), while pushing out polymer material through the exit of the panel before it exits. The strong force of the impact may cause acoustic modal waves to propagate through the material. There may be no pulling of the material, but there may be a viscoelastic stress wave response in the radial direction of the bullet, where the modal wave may push the material uniformly inward and outward. The heat generated by the penetration of the projectile facilitates self-healing, when the local material around the penetration site melts and flows to close the hole (images 104 to 108 of FIG. 1).

The various embodiments provide multi-layered self-healing materials, capable of repairing puncture damage. The multi-layered self-healing materials, capable of repairing puncture damage of the various embodiments may be constructed by sandwiching a reactive (e.g., oxygen sensitive) liquid monomer formulation between two solid polymer panels, such as a polymer panel of Barex 210 IN (PBG)

serving as the front layer panel and a polymer panel of Surlyn® 8940 serving as the back layer panel.

The various embodiments may provide a multi-layered self-healing material system, including a first outer support polymer layer, a second outer support polymer layer; and a reactive liquid monomer layer located between the first outer support polymer layer and the second outer support polymer layer. In various embodiments, the multi-layered self-healing material system may be configured to form a barrier between an atmospheric area and a vacuum area, the first outer support polymer layer and the second outer support polymer layers are oxygen impermeable, and the first outer support polymer layer is configured to contact the atmospheric area and the second outer support polymer layer is configured to contact the vacuum area. In various embodiments the reactive liquid monomer layer may be comprised of thiol-ene. In various embodiments the first outer support polymer layer and the second outer support polymer layer may include Barex 210 IN and/or Surlyn. For example, the first outer support polymer layer may be Barex 210 IN, the first outer support polymer layer may be Surlyn, the second outer support polymer layer may be Barex 210 IN, and/or the second outer support polymer layer may be Surlyn. In various embodiments, the thickness of each of the first outer support polymer layer and the second outer support polymer may be greater than or equal to a thickness of the reactive liquid monomer layer. In various embodiments the reactive liquid monomer layer is infused with carbon fibers, glass fibers, and/or silica gel. The multi-layered self-healing material systems of the various embodiments may be used in a micrometeoroid orbital debris (MMOD) shield, such as in the multi-layer insulation of a whipple shield configuration MMOD shield.

The self-healing capability of a tri-layered healing material system according to various embodiments was assessed by shooting panels with .223 caliber full metal jacket (FMJ) bullets and evaluating healing tendencies upon projectile penetration. The intent of this projectile penetration testing was to simulate micro-meteoroid type impact damage to various embodiment tri-layered materials for application to space vehicles. Self-healing was confirmed for various embodiment materials when the site of bullet penetration was found to be completely closed.

The various embodiments may provide methods to produce multi-layered healing polymer systems. The various embodiments may provide a two-tier, self-healing material system that provides a non-intrusive capability to mitigate mid to high velocity impact damage in structures.

Polymers generated by the thiol-ene reaction, a step-growth polymerization between multi-functional thiols and electron-rich vinyl groups, may have tremendous potential in the design of new materials for a variety of applications. The chemical specificity of the reaction may permit polymerization without interference from the presence of other functional groups, and the variety of thiol- and vinyl-functionalized monomers available may allow for facile adjustment of the reactions kinetics and physical properties. The thiol-ene reaction may be initiated by the generation of a radical that subsequently abstracts a thiol hydrogen. The resulting thiyl radical may propagate to a carbon-carbon double bond, yielding a thioether and a carbon-centered radical. Subsequently, the carbon-centered radical may abstract hydrogen from another thiol to ultimately generate a stable thioether and regenerate a thiyl radical, completing the cycle. This reaction mechanism may afford a step-growth molecular weight evolution. Although a linear polymer will result if both the thiol and ene monomers have a functionality of two, a cross-linked polymer network will be generated if one monomer is at least di-functional and the other has a functionality greater than two.

Figure 3:
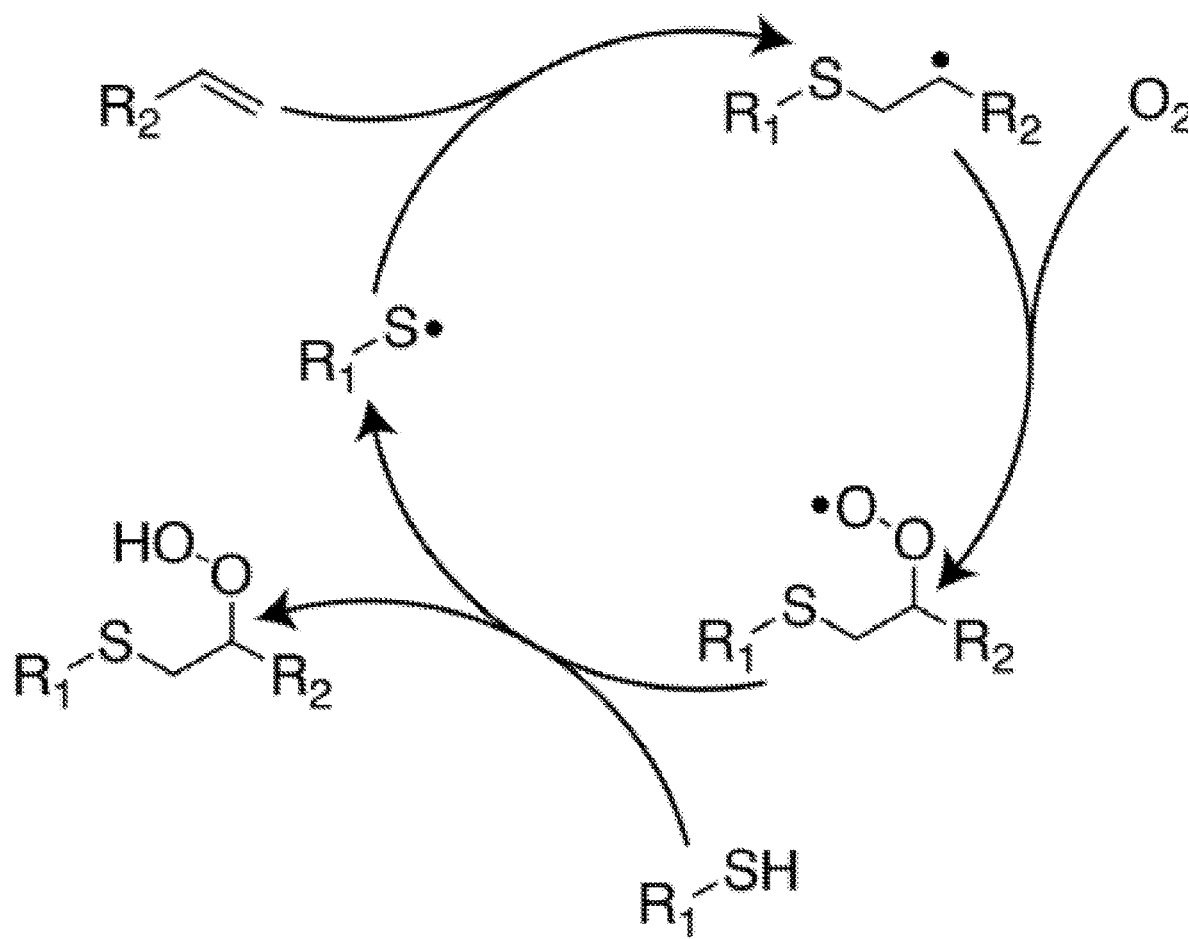
FIG. 3 illustrates the mechanism for thiol-ene oxygen inhibition resistance.

There may be several inherent advantages of the radical-mediated thiol-ene reaction, attributable to its step-growth reaction mechanism, including the high homogeneity of the resultant polymer network and the delayed onset of gelation, leading to a significantly reduced shrinkage stress relative to a conventional, chain-growth polymer network. Moreover, thiol-ene reactions may exhibit extraordinary resistance to oxygen inhibition, as illustrated in FIG. 3. FIG. 3 illustrates the mechanism for thiol-ene oxygen inhibition resistance. As illustrated in FIG. 3, in the presence of oxygen, the carbon-centered radical propagates to generate a peroxyl radical. In a conventional, radical-mediated chain-growth poly-merization, this oxygen-centered radical does not undergo further propagation. However, it is still capable of abstracting a thiol hydrogen to yield the stable thioether with a pendent hydroperoxide and regenerating the thiyl radical. Thus, in the various embodiments oxygen may be employed as a ubiquitous, environmentally-borne reactant, whereupon exposure of the un-reacted thiol-ene material to the atmosphere will generate radicals and initiate the polymerization.

Figure 4:
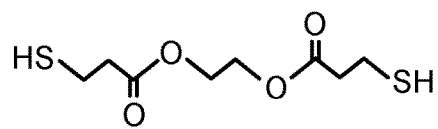
FIG. 4 illustrates the thiol and allyl ether monomers used for bulk polymerization and hydrogel formation.
Figure 4:
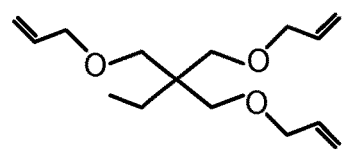
Figure 4:
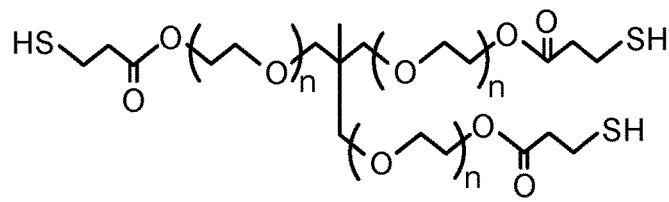
Figure 4:

The various embodiment multi-layered healing polymer systems may utilize trialkylboranes, which, in the presence of oxygen, generate several radical types, including alkyl and alkoxy radicals, via a complex mechanism. Because trialkylboranes may be oxygen-mediated initiators for acrylate-based chain-growth polymerization, these alkyl and alkoxy radicals may be capable of initiating thiol-ene polymerization and experiments have confirmed this. FIG. 4 illustrates the thiol and allyl ether monomers used for bulk polymerization and hydrogel formation. Specifically, FIG. 4 shows the chemical structure of the trimethylol propane triallyl ether (TMPTAE) and ethylene glycol dimercapto-propionate (EGDMP). Experiments have shown that a model thiol-ene resin, comprised of TMPTAE and EGDMP in a 1:1 thiol to ene stoichiometry, formulated with between 0.5 to 2.0 wt % tributylborane (TBB) polymerizes extremely rapidly upon exposure to oxygen, where an approximately 500 μm thick film completely solidifies within seconds of exposure. The extent of reaction (i.e., the conversion) has been measured by using IR spectroscopy to monitor the disappearance of the allyl ether absorbance peak at 6132 $cm^{-1}$. While the toxicity of boranes may preclude their utility in biomedical applications, the rapid polymerization rates witnessed in these experiments indicate that trialkyl-boranes have tremendous potential in autonomously-healing formulations.

Figure 5:
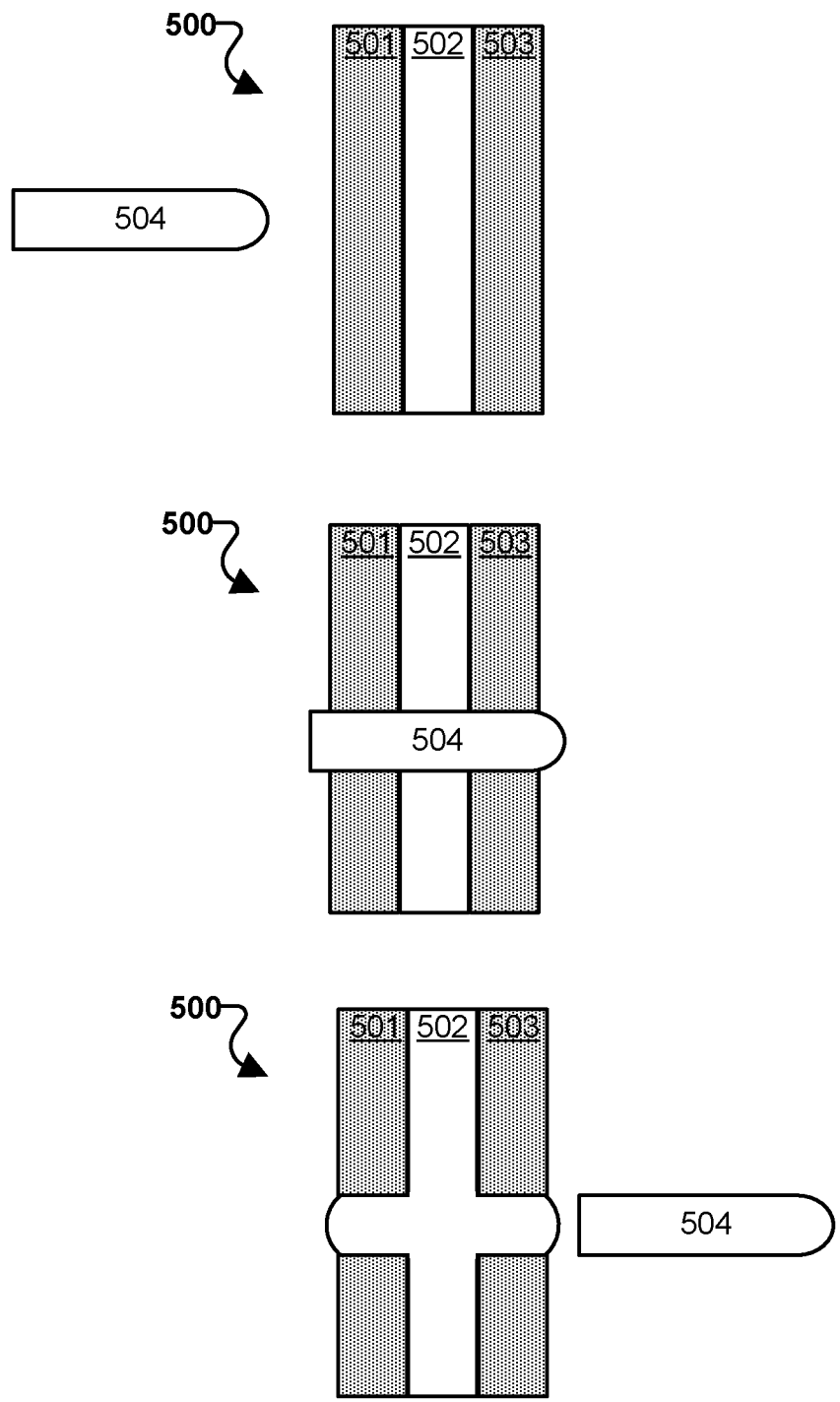
FIG. 5 illustrates a multi-layered healing system according to the various embodiments.

The oxygen-initiated thiol-ene polymerization of the various embodiments provides for augmenting the self-healing properties of polymers such as Barex™ 210 IN and Surlyn® 8940. In the various embodiments, by sandwiching a viscous thiol-ene-based layer between two layers of a puncture healing polymer, a multi-layered healing system according to the various embodiments may be formed. FIG. 5 illustrates a multi-layered healing system 500 according to the various embodiments including a first outer solid support polymer 501 and a second outer support polymer 503 with a reactive liquid monomer formulation layer, such as a liquid thiol-ene layer 502, sandwiched between the first outer solid support polymer 501 and the second outer support polymer 503. In an embodiment, the first outer solid support polymer 501 and a second outer support polymer 503 may be 2 mm thick and the liquid thiol-ene layer 502 may be 1 mm thick. FIG. 5 illustrates that when punctured (by, for example, a bullet 504 simulating a micrometeoroid and orbital debris (MMOD)), the viscous, thiol-ene layer 502 may begin to flow toward the vacuum. Concurrently, the exposure to oxygen will initiate polymerization causing the thiol-ene layer to increase in viscosity and eventually solidify to form a seal (e.g., a hard solid plug) that prevents further oxygen loss. Also, the first outer solid support polymer 501 and a second outer support polymer 503 formed of a puncture healing polymer may heal the projectile penetration site through undergoing puncture healing process. For example, the first outer solid support polymer 501 and a second outer support polymer 503 may be formed of self-healing polymers, such as Barex™ 210 IN and/or Surlyn® 8940. In some embodiments, the first outer solid support polymer 501 and a second outer support polymer 503 may have the same polymer composition. In other embodiments, the first outer solid support polymer 501 and a second outer support polymer 503 may have different polymer compositions. The thiol-ene layer 502 may also work to heal the hole formed by the projectile; however, the thiol-ene layer 502 may not render any structural reinforcement of system 500. In an embodiment, by virtue of the high modulus of Barex 210 IN, the first outer solid support polymer 501 and a second outer support polymer 503 may retain the necessary structural integrity for use in the walls of a habitat/vehicle and, and the reactive middle layer of liquid thiol-ene 502 may exhibit autonomic-healing properties at temperatures below 50° C. Thus, the tri-layered healing system 500 may utilize a two tier self-healing approach for impact mitigation providing both 1) a puncture-healing mechanism, which is triggered by the projectile or damage event itself, and 2) a second mechanism, that is triggered by the presence of oxygen. Both processes may work together to mitigate the damage incurred by damage event.

Figure 6:
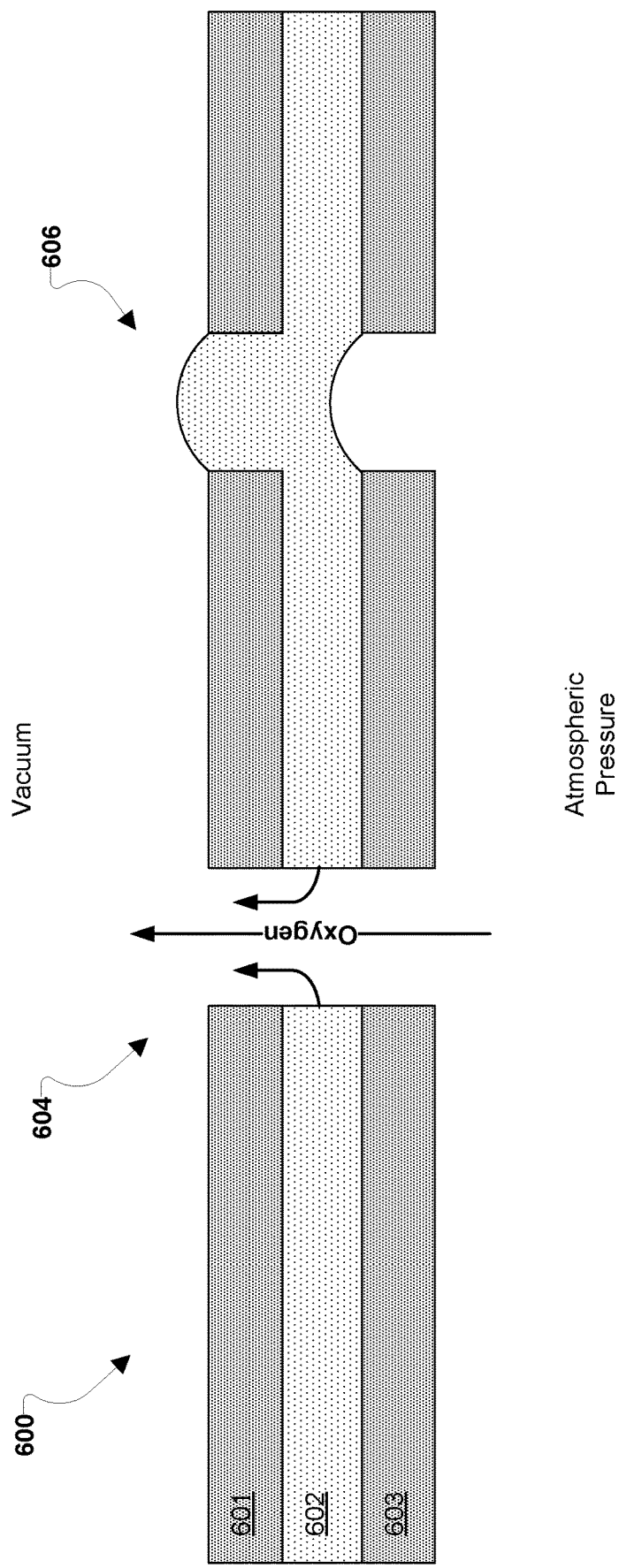
FIG. 6 illustrates a multi-layered healing system according to the various embodiments.

FIG. 6 is a diagram of a self-healing system 600 formed of two oxygen impermeable layers 601 and 603, such as layers of Barex™ 210 IN and/or Surlyn® 8940, with a thiol-ene resin layer 602 sandwiched between the two oxygen impermeable layers 601 and 603. The self healing system 600 may form a boundary (e.g., a spacecraft or space suit wall) between an atmospheric pressure area (such as an oxygen filed life supporting area or oxygen tank) and a vacuum area (such as space). When a puncture 604 occurs in the self-healing system 600, oxygen from the atmosphere pressure area and the resin of the thiol-ene resin layer 602 may flow toward the vacuum. The presence of the oxygen may begin to polymerize the thiol-ene resin layer 602 increasing its viscosity to form a solid, cross-linked plug 606 that may seal the breach and prevent further oxygen loss.

To establish the feasibility of this multi-layered healing approach, several multilayer panels were constructed by sandwiching the reactive liquid monomer formulation between two solid polymer panels serving as the front layer and as the back layer. Barex 210 IN was used as resin matrix for front layer and Barex 210 IN and Surlyn 8940 were used as resin matrices for rear panels. Additionally, some monomer formulations were modified by adding either silica gel or glass fiber. Ballistic testing was conducted to determine the self-healing characteristics of several developmental polymers subjected to micro-meteoroid type damage. To obtain dynamic damage measurements for the polymers (i.e., to simulate micro-meteoroid damage) 7.6 cm×7.6 cm panels were fabricated at various thickness (2.0-4.9 mm) and ballistic testing against the 5.56 mm×45 NATO M193 (FMJ). The formulations were shot at ambient temperature (~25° C.). A tri-layered panel was determined to be self-healing if the hole created by the projectile was closed after penetration. Table 1 summarizes the composition of the samples subjected to ballistics testing.

TABLE 1

| Sample ID | Front Panel | Middle Panel | Back Panel |
|---|---|---|---|
| 1 | PBG | EGDMP-TMPTAE-TBB (1.5 mm) | PBG |
| 2 | PBG | EGDMP-TMPTAE-TBB (1.0 mm) | PBG |
| 3 | PBG | Air (1.0 mm) | PBG |
| 4 | PBG | EGDMP-TMPTAE-TBB (0.3 mm) | PBG |
| 5 | PBG | EGDMP-TMPTAE-TBB + glass fiber (1.5 mm) | Surlyn |
| 6 | PBG | EGDMP-TMPTAE-TBB + silica (24%) (1.5 mm) | Surlyn |

The ballistic testing experiments included of an examination of six multilayered panel samples. Multi-layered panel samples 1-3 were constructed with PBG layers in front and back. Each layer had a thickness of 4.9 mm. The middle layer for samples 1 and 2 consisted of EGDMP-TMPTAE-TBB (thickness ~1.5 mm) and EGDMP-TMPTAE-TBB (thickness ~1.0 mm) respectively. Multi-layered panel sample 3 consisted of a middle layer of air (1.0 mm) and served as a control. The first three multilayered panel samples failed to heal following projectile puncture. A hole was left in the rear of the each panel system. Panel sample 4, was similar in construction to the samples 1 and 2, except all of the layers were thinner: the PBG thickness, for both front and back, was decreased from 3 mm to ~1.5 mm and the liquid middle layer was decreased to ~0.3 mm. Despite these thickness changes, the ballistic impact result was similar to samples 1 and 2 as the sample exhibited a large exit hole with the liquid rapidly draining out. In an attempt to mitigate the large exit hole, the back panel for samples 5 and 6 was replaced with Surlyn, a material that displays much better self-healing properties at room temperature. The change to Surlyn worked well as neither sample 5 or 6 had a large exit hole, rather there was only a small hole in the front panel composed of PBG 1 mm). The liquid formulations in both sample 5 and 6 were modified to prevent the rapid flow of the liquid out through any hole, where glass fiber was incorporated into the middle layer of sample 5 and silica gel was incorporated into the liquid resin formulation for sample 6. Both approaches were successful as neither liquid flowed out through the small hole in the front panel. Furthermore, it appears that the liquid was able to flow into the small hole in the front panel and polymerize—this was especially apparent in sample 5. In addition, these formula modifications decreased the amount of ejecta upon puncture. These very results demonstrate the viability of this multi-layered self-healing concept.

The various embodiment multi-layered healing material systems demonstrate a self-healing capability, and potentially over a wider temperature range, than that of any currently available systems. The various embodiment multi-layered healing material systems demonstrate a self-healing capability which may be utilized for improved damage tolerance in load bearing structures and as a method of self-mitigation/reliability with respect to overall vehicle health and structural durability. The various embodiment multi-layered healing material systems demonstrate a self-healing capability that may be applicable for space exploration/MMOD applications. The various embodiment multi-layered healing material systems may be infused with carbon fiber to form carbon reinforced polymers (CFRPs) as self-healing materials. Structures that make use of the various embodiment multi-layered healing approaches may produce a healing response from a change in the material's chain mobility as a function of the damage mechanism/condition involved as well as having a secondary mechanism in place for which will help heal penetrations when exposed to oxygen. The various embodiment multi-layered healing material systems may possess better mechanical properties, healing capability at elevated temperatures, and faster healing rates (less than 100 microseconds) than current structures. The various embodiment multi-layered healing material systems have application in aircraft and aerospace applications as well as in other pressure loaded type structures. Structures utilizing self-healing polymer matrices of the various embodiments may offer the following advantages: 1) increased damage tolerance compared to current thermosetting polymer matrices which incur a greater extent of impact damage compared to composites developed with the materials of the various embodiments; 2) self-repairing polymer matrices may provide a route for recovery of a large proportion of the pristine mechanical properties, thus extending the life of the structure; 3) since self-healing is an intrinsic property of the matrix material of the various embodiments, the matrix may be treated as a direct substitute to conventional thermosetting matrices that do not possess self-healing characteristics; 4) the intrinsic healing of the various embodiment autonomously healing systems may not require the introduction of microcapsules needed by other healing polymer matrices and therefore, the various embodiments have the advantage of not needing microcapsules which may act as defect initiators in the composite; and 5) as long as there is no significant loss of matrix material mass incurred during the damage event, the materials of the various embodiments may self-heal repeatedly, compared to the microcapsule approach, where healing is limited by the amount of monomer present at the site where damage occurs.

Potential applications for multi-layered healing system of the various embodiments include, but are not limited to, the following: 1) space habitats/structures MMOD protective liners; 2) radiation shielding; 3) fuel tank liners; 4) encasing for hydraulics; 5) encasings for fuel lines; and 6) wire insulation material.

Figure 7:
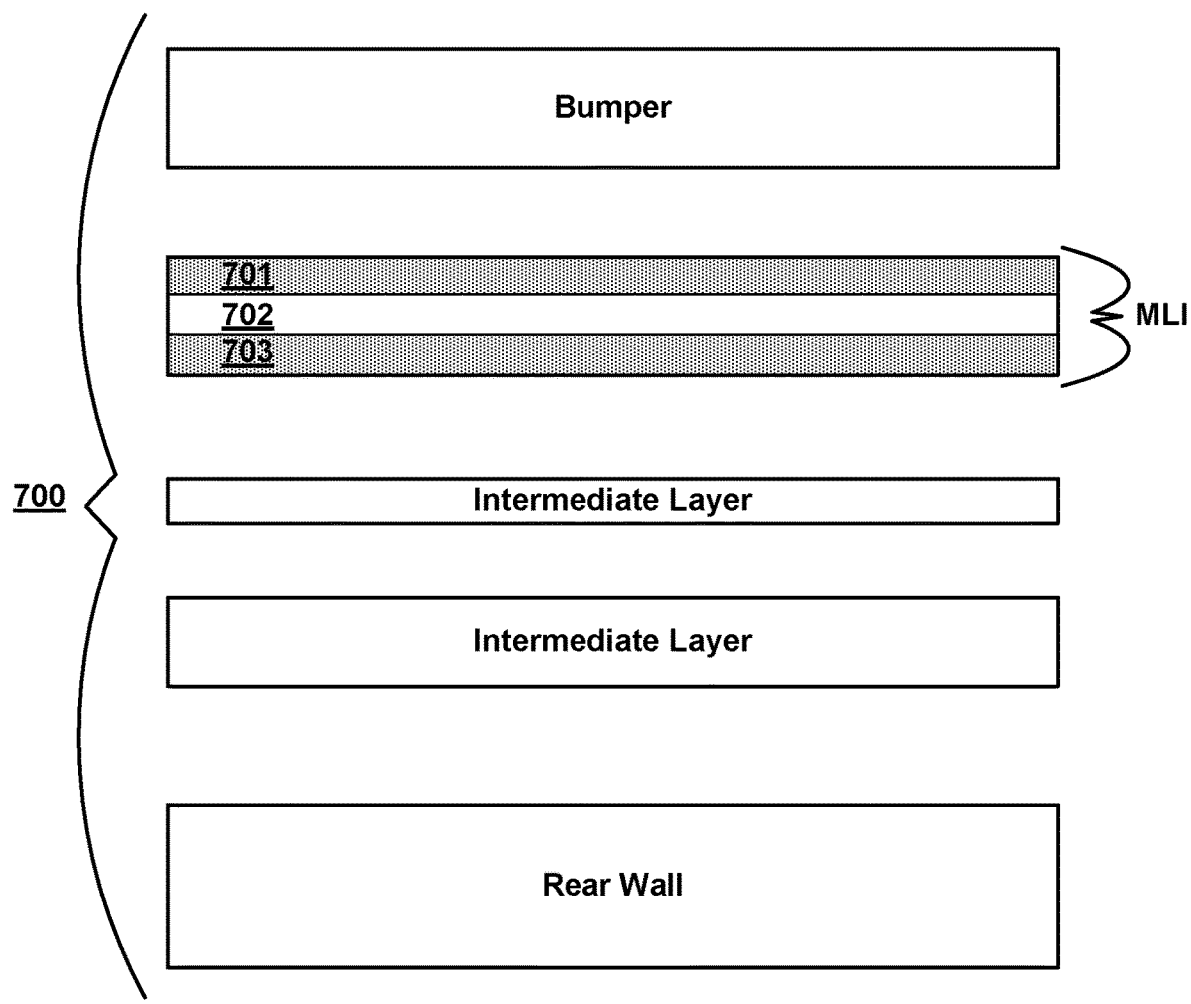
FIG. 7 illustrates layers of a stuffed whipple shield configuration according to an embodiment.

One area where multifunctional materials of the various embodiments may be extremely beneficial is in the micrometeoroid orbital debris (MMOD) shield. A typical MMOD shield on the International Space Station (ISS) is a stuffed whipple shield consisting of multiple layers. One of those layers is the thermal blanket, or multi-layer insulation (MLI), Increasing the MMOD effectiveness of MLI blankets, while still preserving their thermal capabilities, could allow for a less massive MMOD shield. By adding a multi-layered self-healing material of the various embodiments as a component of the MLI the effectiveness of MLI blanket may be increased. The puncture healing layer of the various embodiments may serve a dual purpose as a protective liner and radiation shield, thus allowing for a less massive MMOD shield. The multi-layered healing material system of the various embodiments may include the polymer Surlyn 8940, which may be primarily made up of polyethylene, a radiation shielding material. By using advanced shielding concepts, a reduction of up to 50% in mass may be achieved. FIG. 7 illustrates an embodiment stuffed whipple shield configuration including a bumper layer, a MLI layer, two intermediate layers, and a rear wall. The MLI layer may be formed from a self-healing system formed of two oxygen impermeable layers 701 and 703, such as layers of poly (butadiene)graft-(methyl acrylate-co-acrylonitrile), such as Barex™ 210 IN, and/or poly(ethylene-co-methacrylic acid), such as Surlyn® 8940, with a thiol-ene resin layer 702 sandwiched between the two oxygen impermeable layers 701 and 703.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A multi-layered self-healing material system, comprising:
    a first outer support polymer layer;
    a second outer support polymer layer;
    wherein the first outer support polymer layer and the second outer support polymer layer are oxygen impermeable; and
    a liquid composition located between the first outer support polymer layer and the second outer support polymer layer,
    wherein the liquid composition consists of a thiol monomer, an ene monomer, and a trialkylborane oxygen-mediated initiator, and optionally carbon fibers, glass fibers, or silica gel, wherein the thiol and the ene are in an un-reacted state.

2. The multi-layered self-healing material system of claim 1, wherein:
the multi-layered self-healing material system is configured to form a barrier between an atmospheric area and a vacuum area;
the first outer support polymer layer and the second outer support polymer layers are oxygen impermeable; and
the first outer support polymer layer is configured to contact the atmospheric area and the second outer support polymer layer is configured to contact the vacuum area.

3. The multi-layered self-healing material system of claim 2, wherein the first outer support polymer layer and the second outer support polymer layer are comprised of poly (butadiene)-graft-(methyl acrylate-co-acrylonitrile) or poly (ethylene-co-methacrylic acid).

4. The multi-layered self-healing material system of claim 1, wherein the first outer support polymer layer and the second outer support polymer layer are comprised of poly (butadiene)-graft-(methyl acrylate-co-acrylonitrile).

5. The multi-layered self-healing material system of claim 1, wherein the first outer support polymer layer is comprised of poly(butadiene)-graft-(methyl acrylate-co-acrylonitrile) and the second outer support polymer layer is comprised of poly(ethylene-co-methacrylic acid).

6. The multi-layered self-healing material system of claim 1, wherein a thickness of each of the first outer support polymer layer and the second outer support polymer is greater than the thickness of the liquid composition.

7. The multi-layered self-healing material system of claim 1, wherein the thickness of the liquid composition is between 0.3 mm and 1.5 mm.

8. The multi-layered self-healing material system of claim 1, wherein the thickness of the liquid composition is 1 mm and the thickness of each of the first outer support polymer layer and the second outer support polymer is 2 mm.

9. The multi-layered self-healing material system of claim 1, wherein the liquid composition is infused with carbon fibers.

10. The multi-layered self-healing material system of claim 1, wherein the liquid composition is infused with glass fibers.

11. The multi-layered self-healing material system of claim 1, wherein the liquid composition is infused with silica gel.

12. A micrometeoroid orbital debris (MMOD) shield, comprising:
a multi-layer insulation layer comprising a multi-layered self-healing material system, wherein the multi-layered self-healing material system comprises:
a first outer support polymer layer;
a second outer support polymer layer;
wherein the first outer support polymer layer and the second outer support polymer layer are oxygen impermeable; and
a liquid composition located between the first outer support polymer layer and the second outer support polymer layer,
wherein the liquid composition consists of a thiol monomer, an ene monomer, and a trialkylborane oxygen-mediated initiator, and optionally carbon fibers, glass fibers, or silica gel, wherein the thiol and the ene are in an un-reacted state.

13. The MMOD shield of claim 12, wherein the first outer support polymer layer is comprised of poly(butadiene)-graft-(methyl acrylate-co-acrylonitrile) and the second outer support polymer layer is comprised of poly(ethylene-co-methacrylic acid).

14. The MMOD shield of claim 12, wherein the liquid composition is infused with one or more of the group consisting of carbon fibers, glass fibers, and silica gel.

15. The MMOD shield of claim 14, further comprising:
a bumper layer;
two intermediate layers; and
a rear wall, wherein the multi-layer insulation layer separates the bumper layer from the two intermediate layers and the two intermediate layers separate the multi-layer insulation layer from the rear wall.

16. The MMOD shield of claim 12, wherein the first outer support polymer layer and the second outer support polymer layer are comprised of poly (butadiene)-graft-(methyl acrylate-co-acrylonitrile) or poly(ethylene-co-methacrylic acid).

17. The MMOD shield of claim 12, wherein the first outer support polymer layer and the second outer support polymer layer are comprised of poly(butadiene)-graft-(methyl acrylate-co-acrylonitrile).

* * * * *